(12) United States Patent
Åström et al.

(10) Patent No.: US 12,160,851 B2
(45) Date of Patent: Dec. 3, 2024

(54) SIGNAL ALLOCATION IN A CARRIER

(71) Applicant: Telefonaktiebolaget LM Ericsson (publ), Stockholm (SE)

(72) Inventors: Magnus Åström, Lund (SE); Anders Wallén, Ystad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 388 days.

(21) Appl. No.: 17/636,548

(22) PCT Filed: Aug. 20, 2020

(86) PCT No.: PCT/EP2020/073325
§ 371 (c)(1),
(2) Date: Feb. 18, 2022

(87) PCT Pub. No.: WO2021/037663
PCT Pub. Date: Mar. 4, 2021

(65) Prior Publication Data
US 2022/0303963 A1    Sep. 22, 2022

Related U.S. Application Data

(60) Provisional application No. 62/892,228, filed on Aug. 27, 2019.

(51) Int. Cl.
*H04W 72/044* (2023.01)
*H04W 52/02* (2009.01)

(52) U.S. Cl.
CPC ..... *H04W 72/044* (2013.01); *H04W 52/0229* (2013.01)

(58) Field of Classification Search
CPC .............. H04W 72/044; H04W 52/0229
(Continued)

(56) References Cited

U.S. PATENT DOCUMENTS

| 2010/0067465 | A1* | 3/2010 | Miki | H04L 5/0053 370/329 |
| 2018/0270838 | A1* | 9/2018 | Maheshwari | H04W 52/346 |
| 2020/0295913 | A1* | 9/2020 | Takeda | H04L 5/001 |

OTHER PUBLICATIONS

Japanese Office Action and English Summary dated May 9, 2023 for Application No. 2022-512392, consisting of 6 pages.
(Continued)

*Primary Examiner* — Mark G. Pannell
(74) *Attorney, Agent, or Firm* — Weisberg I.P. Law, P.A.

(57) ABSTRACT

Configuring each of two signals having a frequency bandwidth which is less than a system frequency bandwidth available to the network node for wireless transmissions. The method includes allocating a first signal of the two signals on a first time and frequency resource based on a configuration in which the first signal is included, allocating a second signal of the two signals on a second time and frequency resource based on the configuration, wherein frequency use of the second time and frequency resource is at least partly different from frequency use of the first time and frequency resource, and providing signalling for a wireless communication device enabling the wireless communication device to derive the first and second time and frequency resources. Allocating the first and second signals includes allocating another time and frequency resource adjacent in time or frequency to at least one of the first and the second signals.

8 Claims, 6 Drawing Sheets

(58) Field of Classification Search
USPC .......................................................... 370/311
See application file for complete search history.

(56) References Cited

OTHER PUBLICATIONS

3GPP TSG-RAN WG1 Meeting #97 R1-1907632; Title: UE-group wake-up signal in LTE-MTC; Agenda Item: 6.2.1.1; Source: Ericsson; Document for: Discussion, Decision; Location and Date: Reno, USA., May 13-17, 2019, consisting of 11 pages.

3GPP TSG RAN WG1 Meeting #97 R1-1907206; Title: Consideration on UE-group wake up signal for Rel-16 MTC; Source: Sharp; Agenda item: 6.2.1.1; Document for: Discussion and Decision; Location and Date: Reno, USA, May 13-17, 2019, consisting of 4 pages.

International Search Report and Written Opinion dated Nov. 12, 2020 for International Application No. PCT/EP2020/073325 filed Aug. 20, 2020, consisting of 10 pages.

3GPP TSG-RAN WG1 Meeting #98 R1-1908018; Title: UE-group wake-up signal in LTE-MTC; Agenda Item: 6.2.1.1; Source: Ericsson; Document for: Discussion, Decision; Location and Date: Prague, Czech Rep., Aug. 26-30, 2019, consisting of 12 pages.

3GPP TSG RAN WG1 Meeting #97 R1-1909464; Title: UE-group wake-up signal for eMTC; Source: Intel Corporation; Agenda item: 6.2.1.1; Document for: Discussion and Decision; Location and Date: Prague, CZ, Aug. 26-30, 2019, consisting of 6 pages.

3GPP TSG-RAN WG1 #98 R1-1908825; Title: UE-group wake-up signal for MTC; Agenda item: 6.2.1.1; Source: Qualcomm Incorporated; Document for: Discussion and Decision; Location and Date: Prague, CZ, Aug. 26-30, 2019, consisting 11 pages.

* cited by examiner

SIGNAL ALLOCATION IN A CARRIER

CROSS-REFERENCE TO RELATED APPLICATIONS

This application is a Submission Under 35 U.S.C. § 371 for U.S. National Stage Patent Application of International Application No.: PCT/EP2020/073325, filed Aug. 20, 2020 entitled "SIGNAL ALLOCATION IN A CARRIER," which claims priority to U.S. Provisional Application No.: 62/892228, filed Aug. 27, 2019, entitled "SIGNAL ALLOCATION IN A CARRIER," the entireties of both of which are incorporated herein by reference.

TECHNICAL FIELD

The present disclosure generally relates to allocation of signals in a carrier. In particular, the disclosure relates to allocation of signals occupying only a part of a system frequency bandwidth used for wireless communication.

BACKGROUND

There are technologies to cover Machine-to-Machine (M2M) and/or Internet of Things (IoT) related use cases. There are approaches to support Machine-Type Communications (MTC) with new User Equipment (UE) categories, Cat-M1, Cat-M2, supporting reduced bandwidth of six physical resource blocks (PRBs), or up to 24 PRBs for Cat-M2, and Narrowband IoT (NB-IoT) UEs providing a new radio interface and corresponding UE categories, Cat-NB1 and Cat-NB2.

It will be referred to $3^{rd}$ Generation Partnership Project (3GPP) Long Term Evolution (LTE) enhancements introduced in 3GPP Release 13, 14 and 15 for MTC as "LTE-MTC", including but not limiting to support for bandwidth limited UEs, Cat-M1, and support for coverage enhancements. This is to separate the discussion from NB-IoT, which notation here is used for any Release, although the supported features are similar on a general level.

There are multiple differences between "legacy" LTE and the procedures and channels defined for LTE-MTC and for NB-IoT. Some important differences include a new physical channel, such as the physical downlink control channels, called MPDCCH in LTE-MTC and NPDCCH in NB-IoT, and a new physical random access channel, NPRACH, for NB-IoT. Another difference is the coverage level, also known as coverage enhancement level, that these technologies can support. By applying repetitions to the transmitted signals and channels, both LTE-MTC and NB-IoT allow UE operation down to much lower signal-to-noise ratio (SNR) level compared with LTE, i.e. Es/Iot≥−15 dB being the lowest operating point for LTE-MTC and NB-IoT which can be compared with −6 dB Es/IoT for "legacy" LTE.

There are approaches for reduction of energy consumption, e.g. a 'Wake-up signal' (WUS) which is based on the transmission of a short signal that indicates to the UE that it should continue to decode a downlink (DL) control channel e.g. full MPDCCH for LTE-MTC. If such signal is absent, e.g. in discontinuous transmission (DTX) where the UE cannot detect it, the UE can go back to sleep without decoding the DL control channel. The decoding time for a WUS is considerably shorter than that of the full MPDCCH since the WUS essentially only needs to contain one bit of information whereas the MPDCCH may contain up to 35 bits of information. This, in turn, reduces UE power consumption and leads to longer UE battery life. The WUS would be transmitted only when there is paging for the UE. But if there is no paging for the UE then the WUS will not be transmitted, i.e., implying a DTX, and the UE would go back to sleep e.g. upon detecting DTX instead of WUS. This is illustrated in FIG. 1, where white blocks indicate possible WUS and Paging Occasion (PO) positions whereas the black boxes indicate actual WUS and PO positions.

The specification of Rel-15 WUS is spread out over several parts of the LTE 36-series standard, e.g., 36.211, 36.213, 36.304 and 36.331. The sequence is e.g., defined in 36.211 as follows:

The MTC WUS (MWUS) sequence w(m) in subframe x=0,1, . . . , M−1 is defined by $$w(m) = \theta_{n_f,n_s}(m') e^{j\frac{\pi u n(n+1)}{131}}$$

$$m = 0, 1, \ldots, 131$$

$$m' = m + 132x$$

$$n = m \bmod 132$$

$$\theta_{n_f,n_s}(m') = \begin{cases} 1 & \text{if } c_{n_f,n_s}(2m') = 0 \text{ and } c_{n_f,n_s}(2m'+1) = 0 \\ -1 & \text{if } c_{n_f,n_s}(2m') = 0 \text{ and } c_{n_f,n_s}(2m'+1) = 1 \\ j & \text{if } c_{n_f,n_s}(2m') = 1 \text{ and } c_{n_f,n_s}(2m'+1) = 0 \\ -j & \text{if } c_{n_f,n_s}(2m') = 1 \text{ and } c_{n_f,n_s}(2m'+1) = 1 \end{cases}$$

$$u = (N_{ID}^{cell} \bmod 126) + 3$$

where M is the actual duration of MWUS.

The scrambling sequence $c_{n_f,n_s}(i)$, i=0, 1, . . . , 2·132M−1 is given by clause 7.2, and shall be initialized at the start of the MWUS with $$c_{init\_WUS} = (N_{ID}^{cell} + 1)\left(\left(10 n_{f\_start\_PO} + \left\lfloor \frac{n_{s\_start\_PO}}{2} \right\rfloor\right) \bmod 2048 + 1\right) 2^9 + N_{ID}^{cell}$$

where $n_{f\_start\_PO}$ is the first frame of the first PO to which the MWUS is associated, and $n_{s\_start\_PO}$ is the first slot of the first PO to which the MWUS is associated.

The MWUS bandwidth is two consecutive PRBs, the frequency location of the lowermost PRB signalled by higher layers. For both PRB pairs in the frequency domain, for which MWUS is defined, the MWUS sequence w(m) shall be mapped to resource elements (k, l) in sequence, starting with w(0) in increasing order of first the index k=0,1, . . . , $N_{sc}^{RB}$−1, over the 12 assigned subcarriers and then the index l=3, 4, . . . , $2N_{symb}^{DL}$−1 in each subframe in which MWUS is transmitted.

As from the equations above, the WUS sequence is only dependent on the time instant of the PO to which it is associated and the eNodeB (eNB) cell id. That implies that it is not possible to further distinguish which UE(s) that is(are) paged among the UEs belonging to the same PO. In most cases only a single UE is paged at a time, in which case the remaining UEs will unnecessarily monitor the subsequent MPDCCH.

The same sequence is used for NB-IoT, however, in that case, only one PRB is used, i.e., the signal is not repeated.

In coming Release(s), the WUS is further developed to also include UE grouping, such that the number of UEs that are sensitive to the WUS is further narrowed down to a smaller subset of the UEs that are associated with a specific PO. The legacy WUS was designed such that all UEs belongs to the same group. That is, a transmitted WUS associated to a specific PO may wake-up all UEs that are configured to detect paging at that PO. Hence, all UEs which are not targeted by the page, will wake up unnecessarily.

Furthermore, the legacy WUS only occupies a single resource per PO whereas coming WUS will be configurable to occupy multiple resources. This will lead to less false wake-ups for UEs and hence more power savings. With respect to this the following agreements have been made in 3GPP so far:

LTE-MTC

Agreement

Down-select one of the following options until RAN1#97 based on evaluation results including power saving gain, usage of resources, etc.

Up to 2 orthogonal WUS resources may be configured in time domain

Up to 2 orthogonal WUS resources may be configured in frequency domain

Up to 2 orthogonal WUS resources may be configured per dimension (up to 4 orthogonal WUS resources in total)

Up to 2 orthogonal WUS resources may be configured either in time or frequency domain (only one of the two can be configured)

Determine in RAN1#97 whether legacy WUS resource is counted as one of the configured WUS resource(s).

NB-IoT

Agreement

Up to 2 time-multiplexed WUS resources, for both legacy WUS and group WUS, may be configured. FFS whether a group WUS resource may be shared with legacy WUS or not.

Agreement

Group WUS location in relation to legacy WUS may be configured such that:

If one group WUS resource is configured, that group WUS resource may be configured to coincide with the legacy WUS resource or to occur immediately before the legacy WUS resource, and, If two group WUS resources are configured, the first group WUS resource coincides with the legacy WUS resource and the second group WUS resource occurs immediately before the first group WUS resource.

In addition to the above, it has been shown that many groups are important to achieve low false wake-up rates and hence achieve good UE energy efficiency.

The existing Rel-15 WUS implementation only uses one resource for transmitting WUS. Hence it is not affected by the problem presented in this disclosure, but the single resource results in unnecessarily high false wake-up rates from UEs erroneously detecting WUS without being paged themselves. This is mitigated in Rel-16 where WUS may be allocated to multiple resources, i.e., multiplexed in either time, or frequency, or both.

For Rel-16, the previous alternatives are either to use a set of UE group codes that provides unique codes for all UE groups, regardless of which resource the UE group belongs to, or to use the same set of UE group codes or UE group sequences for all resources, i.e., recycle the codes over different resources. Typically, more codes or sequences allow for more UE groups, which in turn allows for better UE power properties. However, code or sequence designs allowing for many codes typically does not provide as good cross-correlation properties as code designs allowing for fewer codes. Furthermore, transmitting the same signal in multiple frequency locations simultaneously result in increased peak-to-average power ratio (PAPR), i.e., non-linear interference may result from compression in the analog transmitter path. Another problem may be timing ambiguity, i.e., a device with a timing error due to prolonged sleep may erroneously detect its sequence in the wrong timing location.

Existing solutions do not take into account the desirable symmetry properties in allocating a signal in a carrier. For example, if the frequency-wise lowermost and uppermost narrowband parts of a system frequency bandwidth are used as paging narrowband parts, a legacy solution is to allocate a wake-up signal (WUS) resource in the lowermost, centre or uppermost third of the paging narrowband part according to a configuration that is valid for all paging narrowband parts. This may result in unnecessary spurious emissions or configuration requirements, or both, in turn requiring either more expensive circuitry, reduced transmit power or increased signalling. Hence, there is a need for a method that takes the above disadvantages into account and automatically incorporates symmetry properties into the resource configuration.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' realization that it is possible to allocate two or more resources such that they avoid allocation on the outer two PRBs of a carrier without requiring extra signalling for doing so. This is done by, based on a determination of a signal configuration for two or more resources, allocating a first and second signal to those resources in a way that avoids the two PRBs at the very edge of the carrier. For example, this is done by allocating a first resource in the middle of a narrowband and allocating a second resource towards the centre of the carrier. Thus, this implies allocating a non-boosted time and frequency resource adjacent in time and frequency to at least one of the first and the second signals, and wherein the non-boosted time and frequency resource is allocated closer to a boundary of the system frequency bandwidth than the first and second time and frequency resources. Some embodiments have the advantages of reduced need for signalling overhead, and/or limited spurious emissions, in particular from transmitting power boosted signals adjacent to the carrier edges. For a wake-up signal scenario, a signal may be power boosted up to 4.8 or 6 dB, and it is thus desirable to implement an allocation such that, if avoidable, such signal resources avoid the outermost PRBs. Preferably, this allocation should be performed without requiring any extra signalling, or at least limited signalling.

According to a first aspect, there is provided a method performed by a network node for configuring at least two signals. Each of the two signals have a frequency bandwidth which is less than a system frequency bandwidth available to the network node for wireless transmissions. The method comprises allocating a first signal of the two signals on a first time and frequency resource based on a configuration in which the first signal is included, allocating a second signal of the two signals on a second time and frequency resource based on the configuration, wherein frequency use of the second time and frequency resource is at least partly different from frequency use of the first time and frequency resource, and providing signalling for a wireless communication device enabling the wireless communication device to derive the first and second time and frequency resources.

The allocating of the first and second signals includes allocating another time and frequency resource adjacent in time or frequency to at least one of the first and the second signals. The another time and frequency resource is allocated closer to a boundary of the system frequency bandwidth than the first and second time and frequency resources.

The first and second signals may be subject to power boosting of the allocated time and frequency resources for the first and second signals, and any signal in the another time and frequency resource is not subject to power boosting.

The method may comprise allocating a third signal on a third time and frequency resource, and allocating a fourth signal on a fourth time and frequency resource. The allocating of the third and fourth signals may include allocating a further time and frequency resource adjacent in time and frequency to at least one of the third and the fourth signals. Allocation of the first, second, third and fourth signals may be adjacent such that no one of the another or the further time and frequency resources are interspersed between the group of the first and second time and frequency resources and the group of the third and fourth time and frequency resources. The third and fourth signals may be subject to power boosting of the allocated time and frequency resources for the third and fourth signals, and any signal in the another time and frequency resource is not subject to power boosting.

The method may comprise determining a signal configuration for at least the first signal. The signal configuration may belong to one of a plurality of signal configuration generations. The network node may operate according to a 3GPP specification, wherein the signal configuration generations may include 3GPP Release 15 specification and 3GPP Release 16 specification. The second signal may have a different signal configuration than the first signal, e.g. from another signal configuration generation.

The first signal may be intended for one wireless communication device and the second signal may be intended for another wireless device.

The first and second signals may be wake-up signals.

The first and second time and frequency resources may be allocated in a narrowband paging frequency resource of the system frequency bandwidth. The narrowband paging frequency resource may comprise six physical resource blocks of the system frequency bandwidth. The six physical resource blocks are located at any of a centre of the system frequency bandwidth, a highest frequency boundary of the system frequency bandwidth, and a lowest frequency boundary of the system frequency bandwidth.

The allocating of the first and second signals may be such that frequency resources for the first and second signals are occurring simultaneously in time domain but located differently in frequency.

According to a second aspect, there is provided a network node comprising a controller and a transceiver, wherein the network node is arranged to perform the method according to the first aspect.

According to a third aspect, there is provided a computer program comprising instructions which, when executed on a processor of a network node, causes the network node to perform the method according to the first aspect.

According to a fourth aspect, there is provided a method performed by a wireless communication device arranged to receive a second signal of a plurality of transmitted signals including a first and a second signal. Each of the first and second signals have a frequency bandwidth which is less than a system frequency bandwidth available for wireless transmissions. The method comprises receiving signalling including information about time and frequency resources for the first signal, deriving information about time and frequency resources for the second signal from the information about time and frequency resources of the first signal, wherein frequency use of the time and frequency resource for the second signal is at least partly different from frequency use of time and frequency resource for the first signal, and monitoring the time and frequency resources for the second signal for receiving the second signal.

The receiving of signalling including information about time and frequency resources for the first signal may comprise receiving signalling indicating allocation of a first resource to be used for the first signal, and the deriving of information about time and frequency resources for the second signal may comprise determining time and frequency resources for the second signal based on this first resource such that the frequency resource for the second signal is located frequency-wise towards a centre of the system frequency bandwidth in relation to the frequency resource for the first signal.

The second signal may be a wake-up signal, wherein the monitoring of the channel for the second signal may include low-power operation where other signals than the first and the second signals are omitted to be monitored until the wake-up signal provides a wake-up indication such that the wireless communication device commences monitoring other signals.

The first and second time and frequency resources may be allocated in a narrowband paging frequency resource of the system frequency bandwidth. The narrowband paging frequency resource may comprise six physical resource blocks of the system frequency bandwidth. The six physical resource blocks may be located at any of a centre of the system frequency bandwidth, a highest frequency boundary of the system frequency bandwidth, and a lowest frequency boundary of the system frequency bandwidth.

The method may comprise determining a signal configuration for at least the second signal. The signal configuration may belong to one of a plurality of signal configuration generations. The wireless communication device may operate according to a 3GPP specification, wherein the signal configuration generations may include 3GPP Release 15 specification and 3GPP Release 16 specification. The second signal has a different signal configuration than the first signal.

The first and second signals may be allocated at least partly different in frequency and another time and frequency resource may be allocated adjacent in time and frequency to at least one of the first and the second signals, wherein the another time and frequency resource may be allocated closer to a boundary of the system frequency bandwidth than the first and second time and frequency resources. The first frequency may be allocated adjacent to the another signal.

The first and second signals may be such that frequency resources for the first and second signals are occurring simultaneously in time domain but located differently in frequency.

According to a fifth aspect, there is provided a wireless communication device comprising a controller and a transceiver. The wireless communication device is arranged to perform the method according to the fourth aspect.

According to a sixth aspect, there is provided a computer program comprising instructions which, when executed on a processor of a wireless communication device causes the wireless communication device to perform the method according to the fourth aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
FIG. 1 schematically illustrates possible WUS and PO positions and actual WUS and PO positions.
Figure 2:
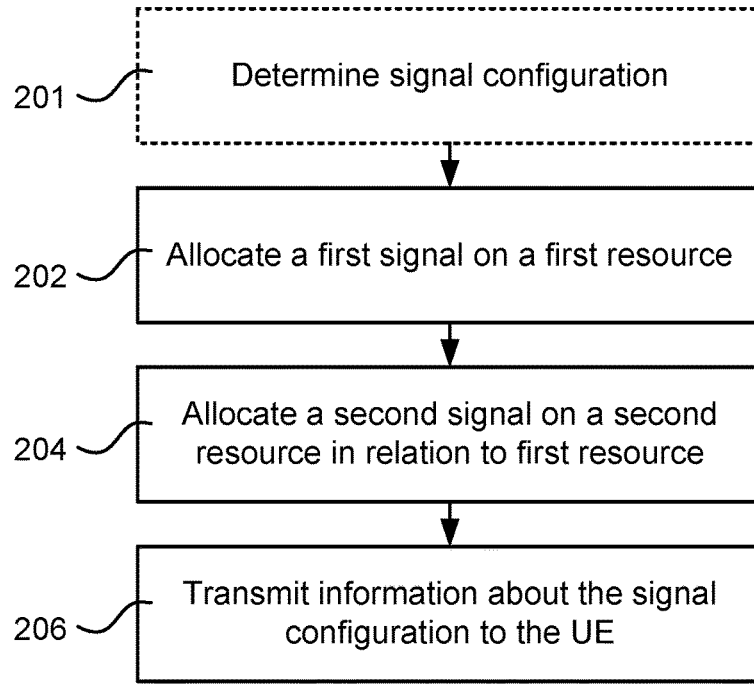
FIG. 2 is a flow chart illustrating a method for a network node according to an embodiment.

This disclosure relates to configuration of signal transmission, and to transmission of a signal. This applies both to a network node and to a wireless communication device, respectively. The signal may be a WUS, e.g. for an LTE-MTC or NB-IoT context, but the approach may be applied to other types of signals and/or contexts. FIG. 2 is a flow chart schematically illustrating operations of the network node. Here, dashed lines indicate optional actions.

Thus, there is provided a method in a network node for configuring (and optionally transmitting) two or more signals within a narrowband, where each signal is to be transmitted in a separate time/frequency resource. The network node may be a base station such as an LTE eNodeB. Furthermore, the configuration is performed according to one or more signal configurations, which is the term used herein for denoting the number and/or type of signals to be transmitted, together with the relative arrangement of the resources used for these signals. In one embodiment, the signals to be transmitted are different wake-up signals (WUS) intended to be received by different UEs, and the narrowband in which the resources are located is a paging narrowband. For example, in a 3GPP LTE system, one signal configuration may be according to Release 15 of the 3GPP specifications and another signal configuration may be according to Release 16 of the 3GPP specifications, i.e. different generations of signal configurations.

For example, if the frequency-wise lowermost and uppermost narrowband parts of a system frequency bandwidth are used as paging narrowband parts, one way is to allocate a wake-up signal (WUS) resource in the lowermost, centre or uppermost third of the paging narrowband part according to a configuration that is valid for all paging narrowband parts.

The description herein has primarily focused on a case where the first and second signals are located within the same narrowband of 6 PRBs, typically the paging narrowband defined for an LTE-MTC UE. However, the same principle of implicitly allocating a second signal further away from the edge of a carrier, i.e defined by the system frequency bandwidth, than is given by the allocation of a first signal can be used also for other scenarios. One such example refers to a situation where a first, e.g. Rel-15, LTE-MTC wake-up signal is allocated at the two PRBs of a paging narrowband which are closest to the LTE carrier centre, and a second, e.g. Rel-16, LTE-MTC wake-up signal is allocated in relation to the first one, still towards the LTE carrier centre. I.e., in this case, the second wake-up signal is located in a different narrowband than the paging narrowband. The further MPDCCH transmission which corresponds a paging message following a transmission of the second wake-up signal may then be located in the original paging narrowband of the first wake-up signal, or alternatively, in the same narrowband as the second wake-up signal. Similarly, in another exemplary scenario, the disclosure may be applied to a situation where a first, e.g. Rel-15, NB-IoT wake-up signal is allocated to an NB-IoT paging carrier consisting of a single PRB in an in-band NB-IoT deployment, and a second, e.g. Rel-16, NB-IoT wake-up signal is allocated in an adjacent PRB in relation to the first one towards the centre of the LTE carrier in which NB-IoT is deployed. The further NPDCCH transmission which corresponds a paging message following a transmission of the second wake-up signal may then be located in the PRB of the original paging carrier of the first wake-up signal, or alternatively, in the same PRB as the second wake-up signal.

The node may determine 201 a signal configuration to use. This may be a signal configuration covering one or more generations of the signal, as defined in different releases of the standard. The signal configuration may be determined from reading a file or from receiving the information from another network node. This other network node may, for example, be a second eNodeB or a Mobility Management Entity (MME). The determination 201 is indicated as optional since the network node simply may know the signal configuration, and the action of determining 200 the signal configuration therefore never really becomes an action.

A first signal is allocated 202 on a first resource according to the determined signal configuration. In one embodiment, the first signal is a first generation (of at least two generations) of a signal whereas in another embodiment, it may be a first signal of multiple signals belonging to a single generation of the signal. A determination of the first resource may be done solely in the network node, or it may be decided elsewhere and communicated to the network node.

A second signal is allocated 204 on a second resource, where the second resource is determined in relation to the first resource and according to the signal configuration. The second signal is either one or more signals of a second generation of the signal (i.e., different generation than that of the first signal), or the second or more signals of the single generation of the signal (i.e., the same generation as that of the first signal). A determination of the second resource is done such that it does not completely overlap in frequency domain with the first resource. It can be noted that the signal configuration determined in 201 may include multiple second signals, as will be discussed in more detail below.

Information about the signal configuration is signalled 206 to a wireless communication terminal, such as a UE. The signalling includes at least information from which a UE may determine the first and second resources. This signalling may be part of one or more broadcasted system information messages that are transmitted to and received by any UE in the cell served by the network node. Alternatively, or additionally, the signalling may be transmitted in one or more dedicated radio resource configuration (RRC) messages to a UE. The information may comprise explicit information about the first resource, for example in terms of a location of the first resource within the narrowband. A UE may then determine the second resource in relation to the first resource in similar ways as the network node determines the second resource above. Alternatively, the information may be implicit, such that a UE may derive the location of the first and second resources indirectly. One example of this may be that the signal configuration is signalled to a UE, and the location of both the first and second resources are derived therefrom, for example as defined in a standards document.

At least one of the first and second signals may be transmitted on their respective allocated resources.

It can be noted that the steps above can be ordered or arranged differently than described. In particular, the signalling 206 may in some embodiments be performed before determining the first or the second resource.

The signal configuration may be arranged in multiple ways. If more than one release of the signal is defined, a first generation of the signal may have the first resource arranged according a fixed location in time, but a flexible location in the frequency domain. For the second generation, resources may instead be arranged in both time and frequency. In one signal configuration, the second resource is arranged according to fixed locations in relation to the first resource. Examples of such relations may be:

1. The first resource frequency multiplexed with the second resource.
2. The first resource time multiplexed with the second resource. Note that the disclosure as described herein does not apply to this case, since it requires that the first and second resource do not overlap completely.
3. The first resource frequency multiplexed with the second resource and frequency multiplexed with another third resource.
4. The first resource frequency multiplexed with the second resource and a third resource time multiplexed with either the first or the second resource.
5. The first resource frequency multiplexed with the second resource, a third resource time multiplexed with the second resource, and a fourth resource time multiplexed with the first resource and frequency multiplexed with the third resource.

If all signals belong to the same generation, the first resource may be configured fixed in time and second resources are arranged in relation to the first resource, in both time and frequency. For all above signal configuration alternatives, the first resource is defined at a location within a narrowband such that all other signals are also comprised within the narrowband.

Figure 4:
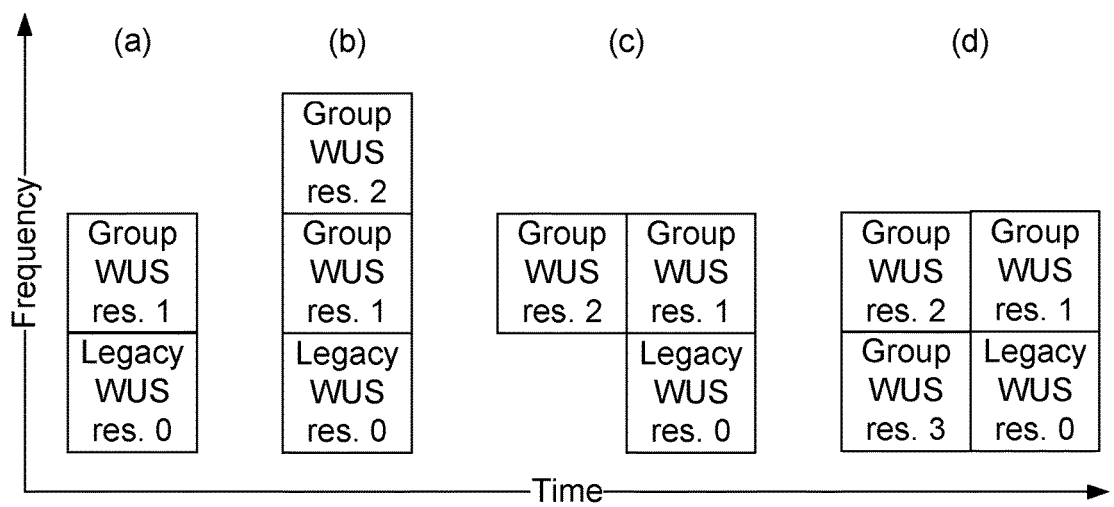
FIG. 4 schematically illustrates various variants of configurations for signals.
Figure 3:
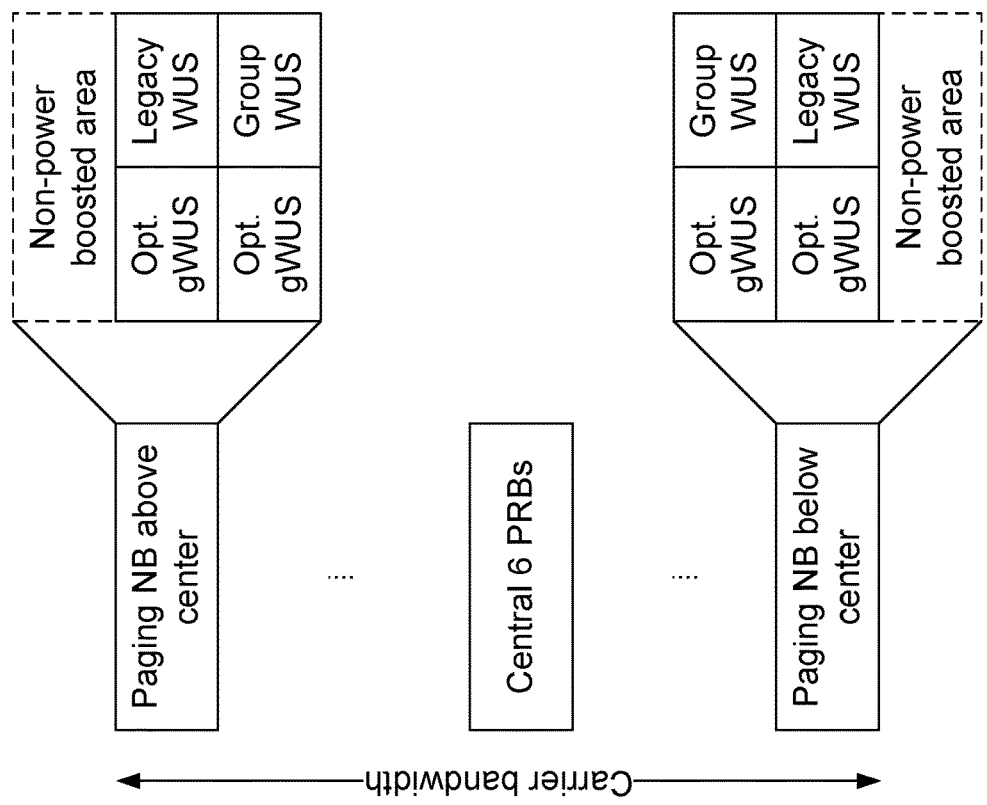
FIG. 3 is a signal allocation chart schematically illustrating principles of embodiments.
Figure 3:
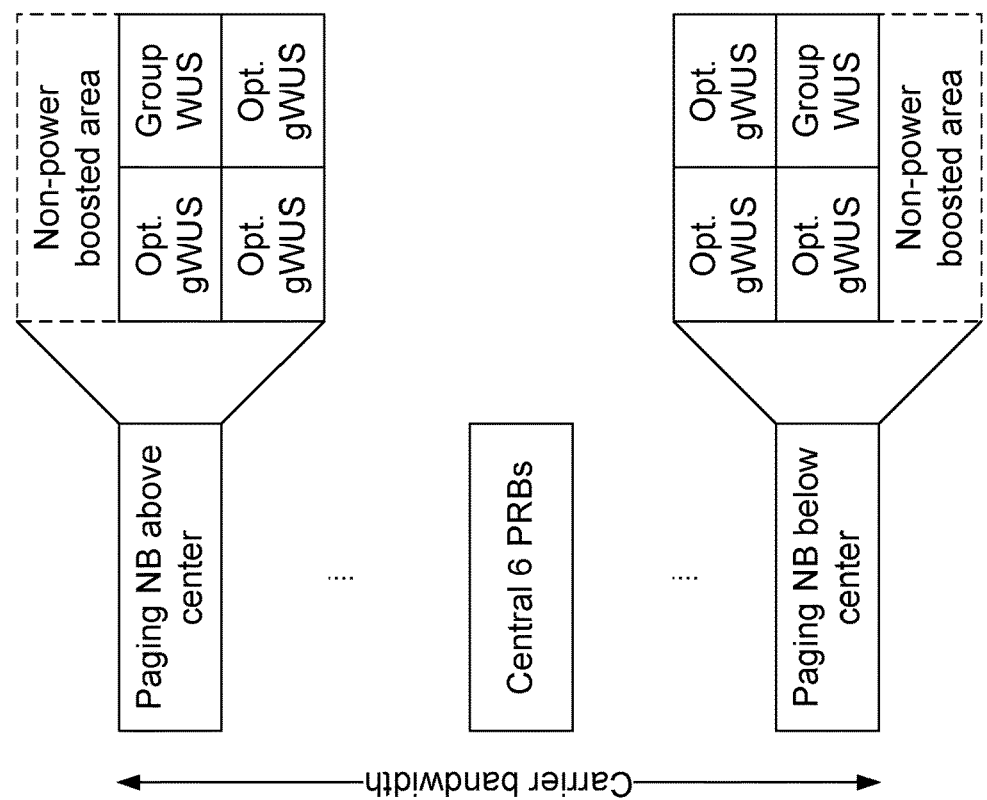

In one embodiment, resources that are separated in frequency from the first resource are located towards the centre of the carrier. Example embodiments of the above method are presented in FIG. 3. In the left part of the figure, a single generation of a wake-up signal is allocated to up to four resources. This single generation may, for example, refer to the LTE Rel-16 Group WUS, which allows for several WUS signals to be configured within the same paging narrowband. The first resource in the figure is labelled "Group WUS" and secondary, optional resources are labelled "Opt. gWUS." In the right figure, a first generation of WUS defines a first resource labelled "Legacy WUS" and a second generation of WUS defines a second resource "Group WUS" and optional third and fourth resources "Opt. gWUS." The first generation may, for example, refer to the LTE Rel-15 WUS, where only one WUS can be used per narrowband, and the second generation may refer to the LTE Rel-16 Group WUS. As can be seen in FIG. 3, narrowband parts that are located at the edge of the carrier will by this method avoid having a WUS resource immediately at the edge but instead two PRBs further in, without requiring any additional signalling. This will, in particular, be beneficial in the cases where one or more of the signals are subject to power boosting, i.e., that they are transmitted with a power that is higher than other PRBs occurring simultaneously in time domain but located differently in frequency domain. This is for example beneficial for WUS. By gravitating the signal allocation towards the centre, such power boosting will reduce the amount of unwanted emissions that extends to frequencies outside the bandwidth of the carrier, and that could potentially cause undesired interference for neighbouring wireless services occupying these frequencies In one embodiment, the resource indexing is performed such that the same time/frequency resource will have the same index number regardless of which signal configuration is chosen. FIG. 4 presents that for the case with two generations, where the centre resource is allocated the lowermost index of the second generation, "Group WUS res. 1" for all signal configurations (a) to (d). Correspondingly, "Group WUS res. 2" is static for signal configurations (c) and (d).

In one embodiment, a wireless communication device, such as a UE, receives signalling indicating allocation of a first resource to be used for a first signal. Based on this first resource, the wireless communication device determines at least one second resource to be used for one or more second signals. In particular, the wireless communication device may determine such a second resource such that it is located frequency-wise towards the centre of the carrier.

In one embodiment, the wireless communication device receives additional signalling from which the wireless communication device may determine which of the first or one or more second resources to monitor for detection of a potential transmission of a first or second signal. In a related embodiment, the wireless communication device determines implicitly which resource to monitor and/or which corresponding signal to detect.

In one embodiment, the wireless communication device additionally receives a radio signal occupying time and frequency resources according to a determined first or second resource and attempts to detect a transmission of a first or second signal on said resource.

Figure 5:
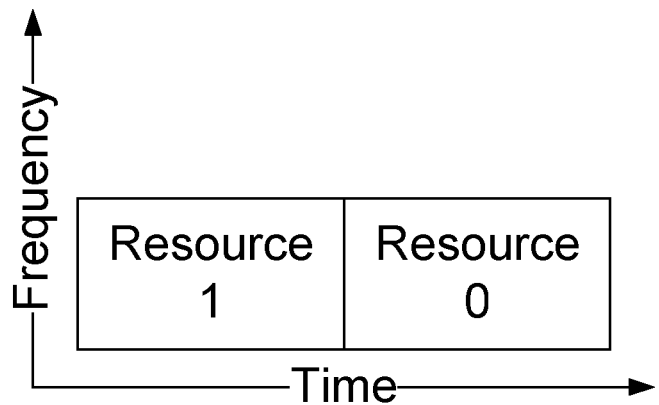
FIG. 5 illustrates an example on time-frequency resources being time multiplexed.
Figure 6:
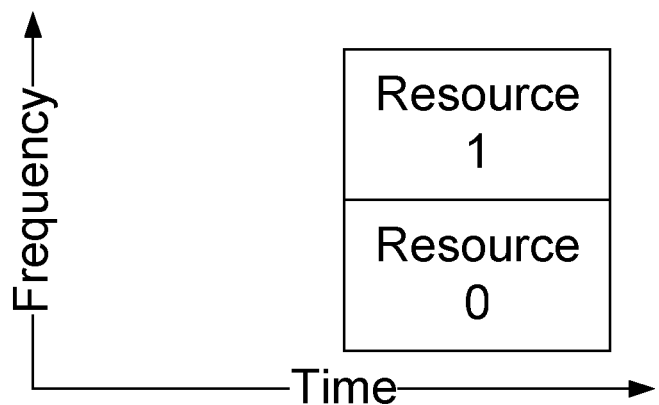
FIG. 6 illustrates an example on time-frequency resources being frequency multiplexed.
Figure 7:
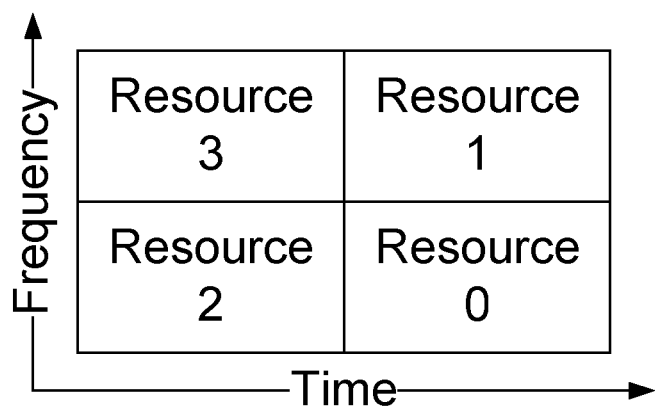
FIG. 7 illustrates an example on time-frequency resources being multiplexed in both time and frequency.

The time-frequency resources may be time multiplexed, as illustrated in FIG. 5, or be frequency multiplexed, as illustrated in FIG. 6, or be multiplexed in both time and frequency, as illustrated in FIG. 7.

Here, the term "adjacent" should be construed in its context of that the receiver to receive the signal is desired to operate in a narrow band, e.g. 1.4 MHz or narrower, compared with a band in which a cellular receiver usually operates, e.g. 20 MHz or wider, and that the receiver to receive the signal should be on only for a short time, both to save energy. Thus, "adjacent" should thus be construed as within such limitations but not necessarily consecutive time and/or frequency PRBs.

Figure 8:
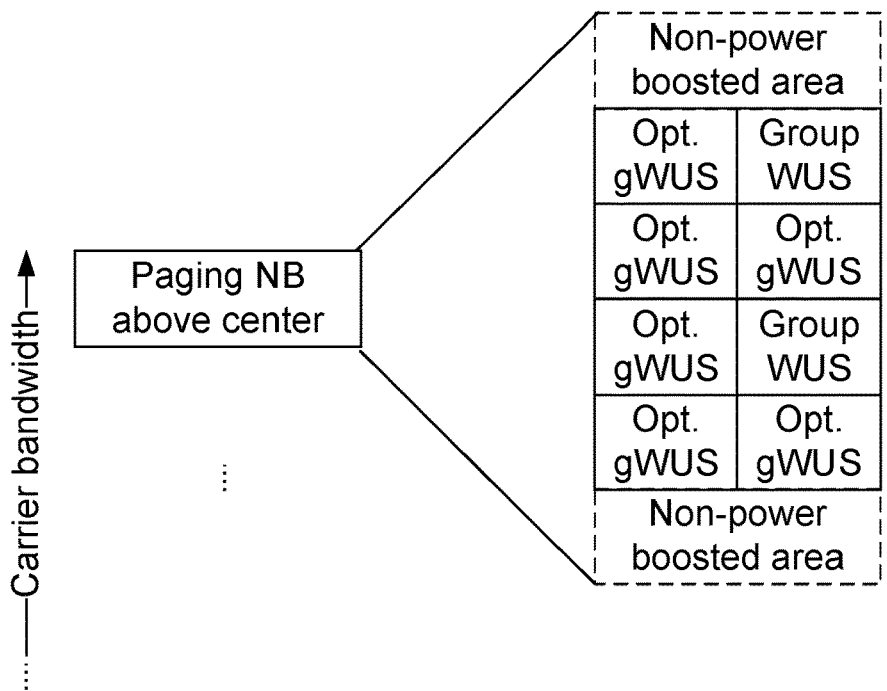
FIG. 8 illustrates signal allocations close to a boundary of a system frequency bandwidth.

FIG. 8 illustrates an embodiment where further resources are allocated where the allocating of the further signals, when the further signals are subject to power boosting by the allocated time and frequency resources for the third and fourth signals, includes allocating a non-boosted time and frequency resource adjacent in time and frequency to at least one of the further signals, and wherein allocation of the power boosted signals is adjacent such that no non-boosted time and frequency resources are interspersed between the groups of time and frequency resources.

Figure 9:
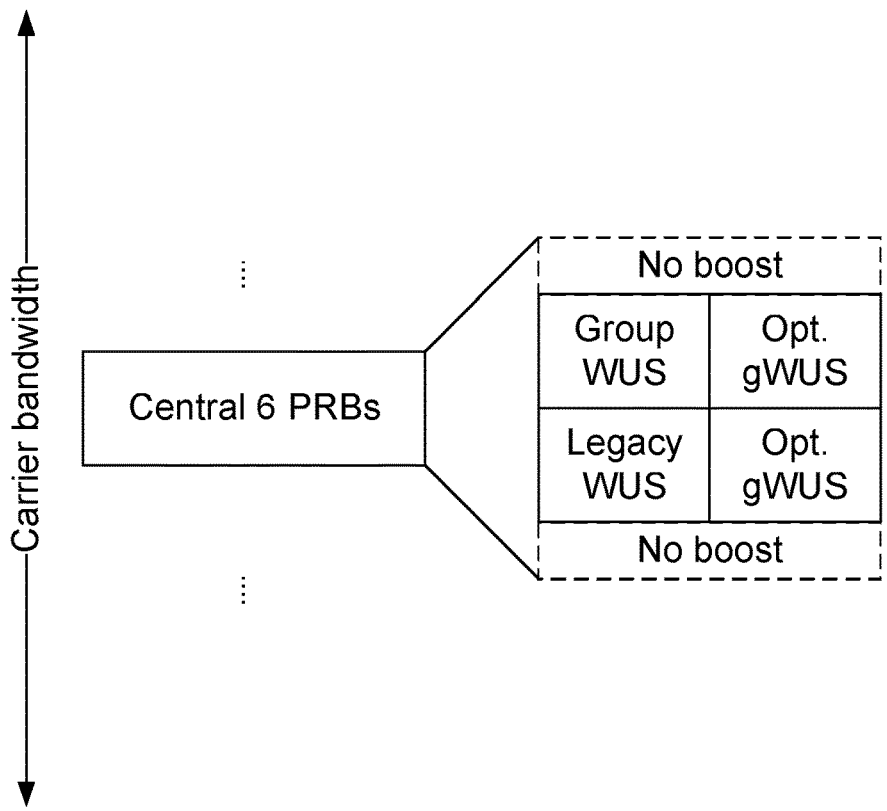
FIG. 9 illustrates signal allocations close to a centre frequency of a system frequency bandwidth.

FIG. 9 illustrates an embodiment where the signals are allocated within the system frequency bandwidth, e.g. on six of the central PRBs. Non-boosted frequency resources can then be allocated at frequencies facing the rest of the resources of the system frequency bandwidth.

Figure 10:
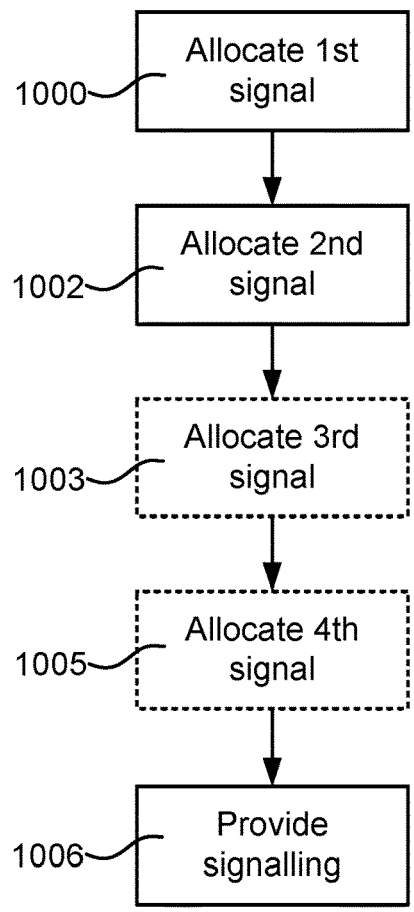
FIG. 10 is a flow chart illustrating a method according to embodiments.

FIG. 10 is a flow chart illustrating a method according to embodiments. The method includes allocating 1000 a first signal of the two signals on a first time and frequency resource based on a signal configuration of the first signal, and allocating 1002 a second signal of the two signals on a second time and frequency resource. Here, frequency use of the second time and frequency resource is at least partly different from frequency use of the first time and frequency resource, as for example demonstrated with reference to FIGS. 6 and 7. The allocating 1000, 1002 of the first and second signals, when the signals are subject to power boosting by the allocated time and frequency resources for the first and second signals, includes allocating a non-boosted time and frequency resource adjacent in time and frequency to at least one of the first and the second signals as discussed above. The non-boosted time and frequency resource may be allocated closer to a boundary of the system frequency bandwidth than the first and second time and frequency resources. Optionally, the method may include allocating 1003 a third signal on a third time and frequency resource and allocating 1005 a fourth signal on a fourth time and frequency resource. In such case, the allocating 1003, 1005 of the third and fourth signals, when the third and fourth signals are subject to power boosting by the allocated time and frequency resources for the third and fourth signals, may include allocating a non-boosted time and frequency resource adjacent in time and frequency to at least one of the third and the fourth signals. The allocation of the power boosted first, second, third and fourth signals in such case is adjacent such that no non-boosted time and frequency resources are interspersed between the group of the first and second time and frequency resources and the group of the third and fourth time and frequency resources. An advantage is that power boosting is collected to adjacent resources, and the non-boosted parts are facing other parts of the system frequency bandwidth and/or the boundary of the system frequency bandwidth.

The method also includes providing 1006 signalling for a wireless communication device enabling the wireless communication device to derive the first and second time and frequency resources, and/or the third and fourth time and frequency resources. Here, it can be noted that the different resources may address different wireless communication devices.

Figure 11:
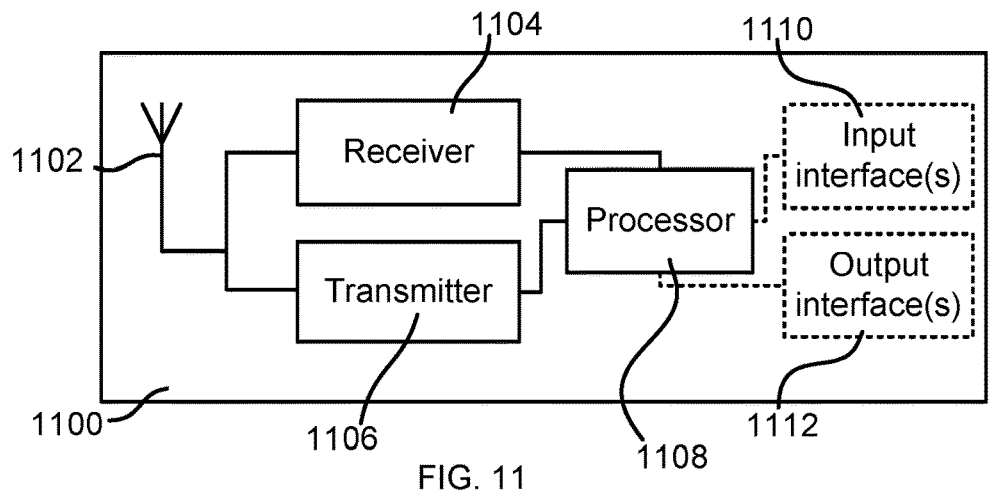
FIG. 11 is a block diagram schematically illustrating a network node according to an embodiment.

FIG. 11 is a block diagram schematically illustrating a network node 1100 according to an embodiment. The network node 1100 comprises an antenna arrangement 1102, a receiver 1104 connected to the antenna arrangement 1102, a transmitter 1106 connected to the antenna arrangement 1102, a processing element 1108 which may comprise one or more circuits, one or more input interfaces 1110 and one or more output interfaces 1112. The interfaces 1110, 1112 can be user interfaces and/or signal interfaces, e.g. electrical or optical. The network node 1100 is arranged to operate in a cellular communication network. In particular, by the processing element 1108 being arranged to perform the embodiments demonstrated with reference to FIGS. 1 to 6, the network node 1100 is capable of performing the approaches demonstrated above. The processing element 1108 can also fulfil a multitude of tasks, ranging from signal processing to enable reception and transmission since it is connected to the receiver 1104 and transmitter 1106, executing applications, controlling the interfaces 1110, 1112, etc.

Figure 12:
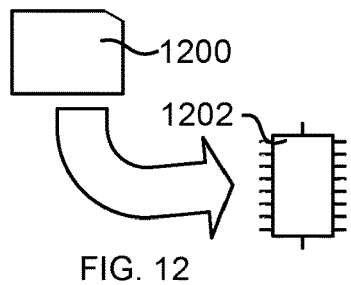
FIG. 12 schematically illustrates a computer-readable medium and a processing device.

The methods according to the present disclosure is suitable for implementation with aid of processing means, such as computers and/or processors, especially for the case where the processing element 1108 demonstrated above comprises a processor handling resource allocation. Therefore, there is provided computer programs, comprising instructions arranged to cause the processing means, processor, or computer to perform the steps of any of the methods according to any of the embodiments described with reference to FIGS. 1 to 10. The computer programs preferably comprise program code which is stored on a computer readable medium 1200, as illustrated in FIG. 12, which can be loaded and executed by a processing means, processor, or computer 1202 to cause it to perform the methods, respectively, according to embodiments of the present disclosure, preferably as any of the embodiments described with reference to FIGS. 1 to 10. The computer 1202 and computer program product 1200 can be arranged to execute the program code sequentially where actions of the any of the methods are performed stepwise or be performed on a real-time basis. The processing means, processor, or computer 1202 is preferably what normally is referred to as an embedded system. Thus, the depicted computer readable medium 1200 and computer 1202 in FIG. 12 should be construed to be for illustrative purposes only to provide understanding of the principle, and not to be construed as any direct illustration of the elements.

Figure 13:
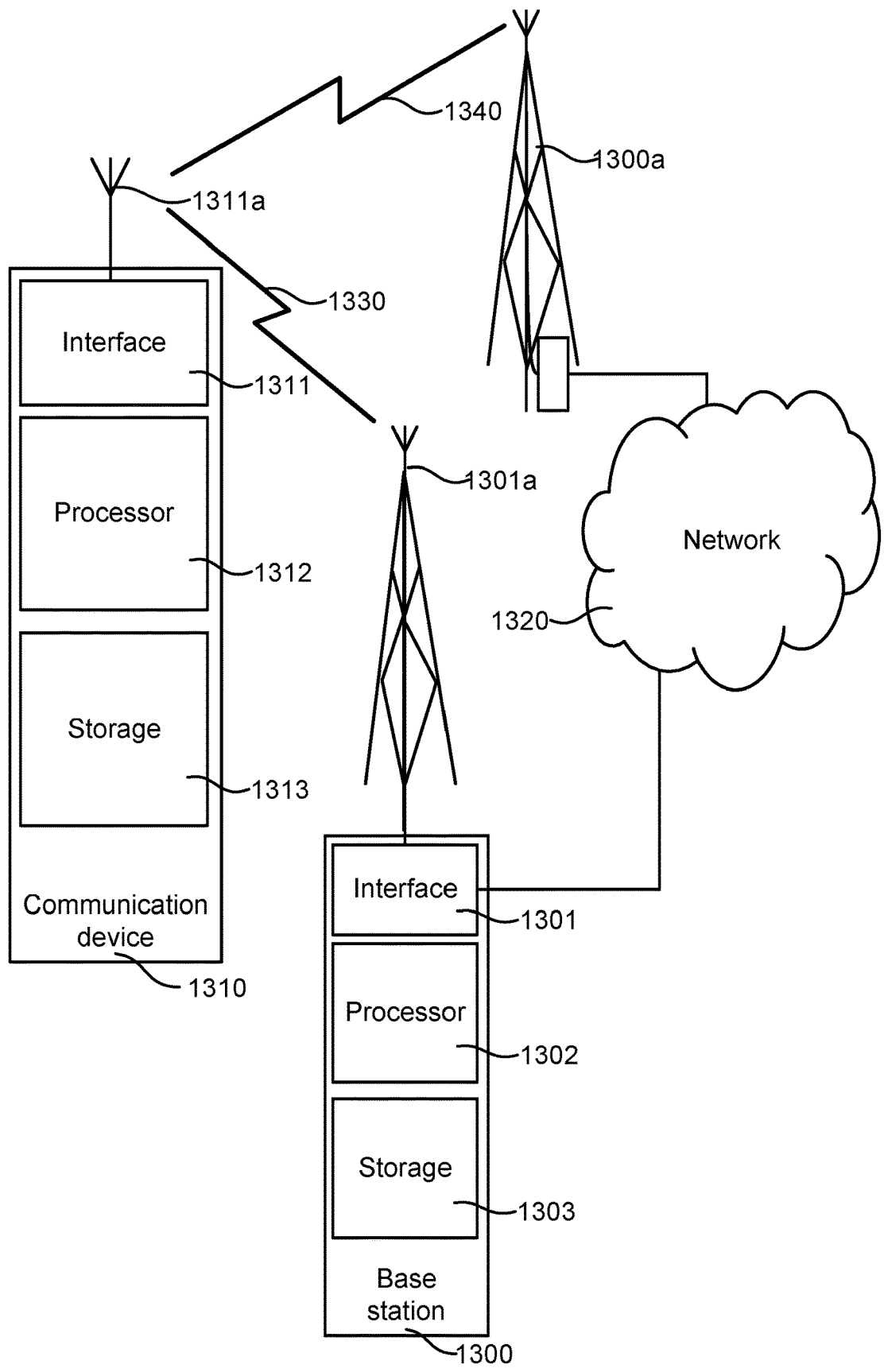
FIG. 13 illustrates a wireless network including network nodes and a wireless communication device.

FIG. 13 illustrates a wireless network comprising network (NW) nodes 1300 and 1300a and a wireless device 1310 with a more detailed view of the network node 1300 and the communication device 1310 in accordance with an embodiment. For simplicity, FIG. 13 only depicts core network 1320, network nodes 1300 and 1300a, and communication device 1310. Network node 1300 comprises a processor 1302, storage 1303, interface 1301, and antenna 1301a. Similarly, the communication device 1310 comprises a processor 1312, storage 1313, interface 1311 and antenna 1311a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 1320 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. The network 1320 may comprise a network node for performing the method demonstrated with reference to FIG. 8, and/or an interface for signalling between network nodes 1300, 1300a.

The network node 1300 comprises a processor 1302, storage 1303, interface 1301, and antenna 1301a. These components are depicted as single boxes located within a single larger box. In practice however, a network node may comprise multiple different physical components that make up a single illustrated component (e.g., interface 1301 may comprise terminals for coupling wires for a wired connection and a radio transceiver for a wireless connection). Similarly, network node 1300 may be composed of multiple physically separate components (e.g., a NodeB component and an RNC component, a BTS component and a BSC component, etc.), which may each have their own respective processor, storage, and interface components. In certain scenarios in which network node 1300 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 1300 may be configured to support multiple radio access technologies (RATs). In such embodiments, some components may be duplicated (e.g., separate storage 1303 for the different RATs) and some components may be reused (e.g., the same antenna 1301a may be shared by the RATs).

The processor 1302 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1300 components, such as storage 1303, network node 1300 functionality. For example, processor 1302 may execute instructions stored in storage 1303. Such functionality may include providing various wireless features discussed herein to a wireless device, such as the wireless device 1310, including any of the features or benefits disclosed herein.

Storage 1303 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1303 may store any suitable instructions, data or information, including software and encoded logic, utilized by the network node 1300. the storage 1303 may be used to store any calculations made by the processor 1302 and/or any data received via the interface 1301.

The network node 1300 also comprises the interface 1301 which may be used in the wired or wireless communication of signalling and/or data between network node 1300, network 1320, and/or wireless device 1310. For example, the interface 1301 may perform any formatting, coding, or translating that may be needed to allow network node 1300 to send and receive data from the network 1320 over a wired connection. The interface 1301 may also include a radio transmitter and/or receiver that may be coupled to or a part of the antenna 1301a. The radio may receive digital data that is to be sent out to other network nodes or wireless devices via a wireless connection. The radio may convert the digital data into a radio signal having the appropriate channel and bandwidth parameters. The radio signal may then be transmitted via antenna 1301a to the appropriate recipient (e.g., the wireless device 1310).

The antenna 1301a may be any type of antenna capable of transmitting and receiving data and/or signals wirelessly. In some embodiments, antenna 1301a may comprise one or more omnidirectional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 1301a may comprise one or more elements for enabling different ranks of SIMO, MISO or MIMO operation.

The wireless device 1310 may be any type of communication device, wireless device, UE, D2D device or ProSe UE, station (STA), etc. but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 1300 and/or other wireless devices. In particular, the wireless device 1310 is capable of communication as demonstrated above, e.g. in an Internet of Things context. The wireless device 1310 comprises a processor 1312, storage 1313, interface 1311, and antenna 1311a. Like the network node 1300, the components of the wireless device 1310 are depicted as single boxes located within a single larger box, however in practice a wireless device may comprises multiple different physical components that make up a single illustrated component (e.g., storage 1313 may comprise multiple discrete microchips, each microchip representing a portion of the total storage capacity).

The processor 1312 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 1310 components, such as storage 1313, wireless device 1310 functionality. Such functionality may include providing various wireless features discussed herein, including any of the features or benefits disclosed herein.

The storage 1313 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 1313 may store any suitable data, instructions, or information, including software and encoded logic, utilized by the wireless device 1310. The storage 1313 may be used to store any calculations made by the processor 1312 and/or any data received via the interface 1311.

The interface 1311 may be used in the wireless communication of signalling and/or data between the wireless device 1310 and the network nodes 1300, 1300a. For example, the interface 1311 may perform any formatting, coding, or translating that may be needed to allow the wireless device 1310 to send and receive data to/from the network nodes 1300, 1300a over a wireless connection. The interface 1311 may also include a radio transmitter and/or receiver that may be coupled to or a part of the antenna 1311a. The radio may receive digital data that is to be sent out to e.g. the network node 1301 via a wireless connection. The radio may convert the digital data into a radio signal having the appropriate channel and bandwidth parameters. The radio signal may then be transmitted via the antenna 1311a to e.g. the network node 1300.

The antenna 1311a may be any type of antenna capable of transmitting and receiving data and/or signals wirelessly. In some embodiments, antenna 1311a may comprise one or more omnidirectional, sector or panel antennas operable to transmit/receive radio signals between 2 GHz and 66 GHz. For simplicity, antenna 1311a may be considered a part of interface 1311 to the extent that a wireless signal is being used. The antenna 1311a may comprise one or more elements for enabling different ranks of SIMO, MISO or MIMO operation.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 1312 and/or 1302, possibly in cooperation with the storage 1313 and/or 1303. The processors 1312 and/or 1302 and the storage 1313 and/or 1303 may thus be arranged to allow the processors 1312 and/or 1302 to fetch instructions from the storage 1313 and/or 1303 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features This Disclosure may be Summarized by the following Items:

1. A method performed by a network node for configuring at least two signals, wherein each of the two signals have a frequency bandwidth which is less than a system frequency bandwidth available to the network node for wireless transmissions, the method comprising allocating a first signal of the two signals on a first time and frequency resource based on a configuration in which the first signal is included;

allocating a second signal of the two signals on a second time and frequency resource based on the configuration, wherein frequency use of the second time and frequency resource is at least partly different from frequency use of the first time and frequency resource; and providing signalling for a wireless communication device enabling the wireless communication device to derive the first and second time and frequency resources, wherein the allocating of the first and second signals includes allocating another time and frequency resource adjacent in time and frequency to at least one of the first and the second signals, and wherein the another time and frequency resource is allocated closer to a boundary of the system frequency bandwidth than the first and second time and frequency resources.

2. The method of item 1, wherein the first and second signals are subject to power boosting of the allocated time and frequency resources for the first and second signals, and any signal in the another time and frequency resource is not subject to power boosting.

3. The method of any one of items 1 or 2, comprising
allocating a third signal on a third time and frequency resource;
allocating a fourth signal on a fourth time and frequency resource,
wherein the allocating of the third and fourth signals includes allocating a further time and frequency resource adjacent in time and frequency to at least one of the third and the fourth signals, and wherein allocation of the first, second, third and fourth signals is adjacent such that no one of the another or the further time and frequency resources are interspersed between the group of the first and second time and frequency resources and the group of the third and fourth time and frequency resources.

4. The method of item 3, wherein the third and fourth signals are subject to power boosting of the allocated time and frequency resources for the third and fourth signals, and any signal in the another time and frequency resource is not subject to power boosting.

5. The method of any one of items 1 to 4, comprising determining a signal configuration for at least the first signal.

6. The method of item 5, wherein the signal configuration belongs to one of a plurality of signal configuration generations.

7. The method of item 6, wherein the network node operates according to a 3GPP specification, and wherein the signal configuration generations include 3GPP Release 15 specification and 3GPP Release 16 specification.

8. The method of any one of items 5 to 7, wherein the second signal has a different signal configuration than the first signal.

9. The method of any one of items 1 to 8, wherein the first signal is intended for one wireless communication device and the second signal is intended for another wireless device.

10. The method of any one of items 1 to 9, wherein the first and second signals are wake-up signals.

11. The method of any one of items 1 to 10, wherein the first and second time and frequency resources are allocated in a narrowband paging frequency resource of the system frequency bandwidth.

12. The method of item 11, wherein the narrowband paging frequency resource comprises six physical resource blocks of the system frequency bandwidth.

13. The method of item 12, wherein the six physical resource blocks are located at any of
a centre of the system frequency bandwidth;
a highest frequency boundary of the system frequency bandwidth; and
a lowest frequency boundary of the system frequency bandwidth.

14. A network node comprising a controller and a transceiver, wherein the network node is arranged to perform the method of any one of items 1 to 13.

15. A computer program comprising instructions which, when executed on a processor of a network node, causes the network node to perform the method according to any one of items 1 to 13.

16. A method performed by a wireless communication device arranged to receive a second signal of a plurality of transmitted signals including a first and a second signal, wherein each of the first and second signals have a frequency bandwidth which is less than a system frequency bandwidth available for wireless transmissions, the method comprising
receiving signalling including information about time and frequency resources for the first signal;
deriving information about time and frequency resources for the second signal from the information about time and frequency resources of the first signal; and
monitoring a channel for receiving the second signal.

17. The method of item 16, wherein the second signal is a wake-up signal, wherein the monitoring of the channel for the second signal includes low-power operation where other signals than the first and the second signals are omitted to be monitored until the wake-up signal provides a wake-up indication such that the wireless communication device commences monitoring other signals.

18. The method of any one of items 16 or 17, wherein the first and second time and frequency resources are allocated in a narrowband paging frequency resource of the system frequency bandwidth.

19. The method of item 18, wherein the narrowband paging frequency resource comprises six physical resource blocks of the system frequency bandwidth.

20. The method of item 19, wherein the six physical resource blocks are located at any of
a centre of the system frequency bandwidth;
a highest frequency boundary of the system frequency bandwidth; and
a lowest frequency boundary of the system frequency bandwidth.

21. The method of any one of items 16 to 20, comprising determining a signal configuration for at least the second signal.

22. The method of item 21, wherein the signal configuration belongs to one of a plurality of signal configuration generations.

23. The method of item 22, wherein the wireless communication device operates according to a 3GPP specification, and wherein the signal configuration generations include 3GPP Release 15 specification and 3GPP Release 16 specification.

24. The method of any one of items 21 to 23, wherein the second signal has a different signal configuration than the first signal.

25. The method of any one of items 16 to 24, wherein the first and second signals are allocated at least partly different in frequency and another time and frequency resource is allocated adjacent in time and frequency to at least one of the first and the second signals, and wherein the another time and frequency resource is allocated closer to a boundary of the system frequency bandwidth than the first and second time and frequency resources.

26. The method of item 25, wherein the first frequency is allocated adjacent to the another signal.

27. A wireless communication device comprising a controller and a transceiver, wherein the wireless communication device is arranged to perform the method of any one of items 16 to 26.

28. A computer program comprising instructions which, when executed on a processor of a wireless communication device causes the wireless communication device to perform the method according to any of items 16 to 26.

The invention claimed is:

1. A method performed by a wireless communication device arranged to receive a second signal of a plurality of transmitted signals including a first and a second signal, each of the first and second signals having a frequency bandwidth which is less than a system frequency bandwidth available for wireless transmissions, the method comprising:
receiving signalling including information about time and frequency resources for the first signal;
deriving information about time and frequency resources for the second signal from the information about time and frequency resources of the first signal, frequency use of the time and frequency resource for the second signal being at least partly different from frequency use of time and frequency resource for the first signal;
monitoring the time and frequency resources for the second signal for receiving the second signal; and
the receiving of signalling including information about time and frequency resources for the first signal comprises receiving signalling indicating allocation of a first resource to be used for the first signal, and the deriving of information about time and frequency resources for the second signal comprises determining time and frequency resources for the second signal based on this first resource such that the frequency resource for the second signal is located frequency-wise towards a center of the system frequency bandwidth in relation to the frequency resource for the first signal.

2. The method of claim 1, wherein the second signal is a wake-up signal, wherein the monitoring of the channel for the second signal includes low-power operation where other signals than the first and the second signals are omitted to be monitored until the wake-up signal provides a wake-up indication such that the wireless communication device commences monitoring other signals.

3. The method of claim 2, wherein the time and frequency resources for the first and second signals are allocated in a narrowband paging frequency resource of the system frequency bandwidth, wherein the narrowband paging frequency resource comprises six physical resource blocks of the system frequency bandwidth.

4. The method of claim 3, wherein the six physical resource blocks are located at any of
a centre of the system frequency bandwidth;
a highest frequency boundary of the system frequency bandwidth; and
a lowest frequency boundary of the system frequency bandwidth.

5. The method of claim 4, comprising determining a signal configuration for at least the second signal, wherein the signal configuration belongs to one of a plurality of signal configuration generations, wherein the wireless communication device operates according to a 3GPP specification, and wherein the signal configuration generations include 3GPP Release 15 specification and 3GPP Release 16 specification.

6. The method of claim 5, wherein the second signal has a different signal configuration than the first signal.

7. The method of claim 6, wherein the first and second signals are such that frequency resources for the first and second signals are occurring simultaneously in time domain but located differently in frequency.

8. A wireless communication device comprising a controller and a transceiver for receiving a second signal of a plurality of transmitted signals including a first and a second signal, each of the first and second signals having a frequency bandwidth which is less than a system frequency bandwidth available for wireless transmissions, the controller and transceiver configured to:

receive signalling including information about time and frequency resources for the first signal;

derive information about time and frequency resources for the second signal from the information about time and frequency resources of the first signal, frequency use of the time and frequency resource for the second signal being at least partly different from frequency use of time and frequency resource for the first signal;

monitor the time and frequency resources for the second signal for receiving the second signal; and the receiving of signalling including information about time and frequency resources for the first signal comprises receiving signalling indicating allocation of a first resource to be used for the first signal, and the deriving of information about time and frequency resources for the second signal comprises determining time and frequency resources for the second signal based on this first resource such that the frequency resource for the second signal is located frequency-wise towards a center of the system frequency bandwidth in relation to the frequency resource for the first signal.

* * * * *